United States Patent
Ochiai et al.

(10) Patent No.: US 10,790,507 B2
(45) Date of Patent: Sep. 29, 2020

(54) METHOD FOR PREPARING CATHODE MATERIAL FOR LITHIUM PRIMARY BATTERY, CATHODE MATERIAL FOR LITHIUM PRIMARY BATTERY, AND LITHIUM PRIMARY BATTERY

(71) Applicant: FDK CORPORATION, Tokyo (JP)

(72) Inventors: Yuki Ochiai, Tokyo (JP); Naoaki Nishimura, Tokyo (JP); Daisuke Hirata, Tokyo (JP); Hiroshi Yanagi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 168 days.

(21) Appl. No.: 15/950,168

(22) Filed: Apr. 11, 2018

(65) Prior Publication Data

US 2018/0301701 A1 Oct. 18, 2018

(30) Foreign Application Priority Data

Apr. 12, 2017 (JP) .................. 2017-078951

(51) Int. Cl.
*H01M 4/50* (2010.01)
*H01M 4/38* (2006.01)
(Continued)

(52) U.S. Cl.
CPC ......... *H01M 4/502* (2013.01); *H01M 4/0404* (2013.01); *H01M 4/08* (2013.01);
(Continued)

(58) Field of Classification Search
None
See application file for complete search history.

(56) References Cited

U.S. PATENT DOCUMENTS

| 5,964,902 A * | 10/1999 | Mao ..................... H01M 4/62 29/623.1 |
| 2002/0172864 A1* | 11/2002 | Yoshimura ............ H01M 4/364 429/224 |

(Continued)

FOREIGN PATENT DOCUMENTS

| JP | H11-339794 A | 12/1999 |
| JP | 2009283291 A * | 12/2009 |

OTHER PUBLICATIONS

Machine translation of JP 2009-283291 A (Year: 2009).*

(Continued)

*Primary Examiner* — Robert S Carrico
(74) *Attorney, Agent, or Firm* — Isshiki International Law Office; Joseph P. Farrar, Esq.

(57) ABSTRACT

A method for preparing cathode material for a lithium primary battery includes an active cathode material and an active anode material. The active cathode material is manganese dioxide, and the active anode material is either one of lithium metal and lithium alloy. The method includes: a first kneading step in which a boron compound and a thickening agent are kneaded with a diluent to prepare a paste made by dissolving the boron compound in the diluent; a second kneading step in which the paste is kneaded with a conductive additive; and a third kneading step in which the paste obtained in the second kneading step is kneaded with the active cathode material and a binder to prepare the cathode material in slurry form.

1 Claim, 3 Drawing Sheets

(51) Int. Cl.

| | |
|---|---|
| *H01M 4/62* | (2006.01) |
| *H01M 4/04* | (2006.01) |
| *H01M 4/40* | (2006.01) |
| *H01M 4/08* | (2006.01) |
| *H01M 6/16* | (2006.01) |
| *H01M 4/64* | (2006.01) |
| *H01M 4/02* | (2006.01) |

(52) U.S. Cl.
CPC ........... *H01M 4/382* (2013.01); *H01M 4/405* (2013.01); *H01M 4/623* (2013.01); *H01M 4/625* (2013.01); *H01M 4/64* (2013.01); *H01M 6/16* (2013.01); *H01M 2004/028* (2013.01)

(56) References Cited

U.S. PATENT DOCUMENTS

| | | | |
|---|---|---|---|
| 2003/0138700 A1* | 7/2003 | Yoshimura | H01M 6/16 429/231.95 |
| 2006/0105233 A1* | 5/2006 | Morita | H01M 2/021 429/162 |
| 2011/0195316 A1* | 8/2011 | Morigaki | H01M 4/505 429/326 |

OTHER PUBLICATIONS

FDK Corporation, "Thin Type Primary Lithium Batteries", searched on Mar. 24, 2017, Japanese Website: <http://www.fdk.co.jp/battery/lithium/lithium_thin.html>; English Website: <http://www.fdk.com/battery/lithium_e/lithium_thin.html>.

* cited by examiner

METHOD FOR PREPARING CATHODE MATERIAL FOR LITHIUM PRIMARY BATTERY, CATHODE MATERIAL FOR LITHIUM PRIMARY BATTERY, AND LITHIUM PRIMARY BATTERY

CROSS-REFERENCE TO RELATED APPLICATIONS

The present application claims priority to Japanese Patent Application No. 2017-078951, filed on Apr. 12, 2017 in the Japan Patent Office, the entire disclosure of which is hereby incorporated by reference herein.

TECHNICAL FIELD

This disclosure relates to a method for preparing a cathode material for a lithium primary battery, a cathode material for a lithium primary battery prepared by the method, and a lithium primary battery incorporating the cathode material for a lithium primary battery prepared by the method.

BACKGROUND ART

There is known a lithium primary battery including active cathode material which is manganese dioxide, and active anode material which is lithium or lithium alloy (hereinafter also referred to as a negative electrode lithium). Such a lithium primary battery has a configuration in which a plate-shaped electrode assembly and non-aqueous organic electrolyte are sealed in a jacket formed of a battery can, laminate film or the like. The electrode assembly includes a positive electrode, a negative electrode, and a separator interposed between the electrodes facing each other. The positive electrode is formed by applying onto a sheet-shaped current collector a cathode material slurry containing an active cathode material, and the negative electrode is formed by placing a plate-shaped negative electrode lithium on a sheet-shaped current collector. In a spiral-wound lithium primary battery which is well known, a plate-shaped electrode assembly is wound into a roll and accommodated in a cylindrical jacket.

SUMMARY

A lithium primary battery whose active cathode material is manganese dioxide has a high energy density, is capable of long-term discharging, and exhibits a small voltage drop till the battery is nearly depleted. A lithium primary battery whose jacket is formed of a battery can is, for example, used as a power supply for stationary gas meters or water meters. A lithium primary battery whose jacket is made of laminate film is, for example, used as a power supply for the following extremely thin, electronic devices (hereinafter referred to as thin electronic devices): An IC card having a one-time password function and including a display; an IC card with a display; a tag and a token (a one-time password generator); and the like.

Meanwhile, a cathode material slurry constituting the positive electrode of a lithium primary battery is made of an active cathode material, a conductive additive, a binder, a thickening agent and the like. Such a cathode material slurry is prepared by mixing these materials and kneading the mixture with a planetary mixer. And, when kneading the source materials, an additive is added to the cathode material if necessary, for improving its characteristics. In particular, when a nearly depleted lithium primary battery whose active cathode material is manganese dioxide is left at elevated temperatures, the manganese dioxide dissolves in the electrolyte, increasing its internal resistance. Accordingly, in order to suppress such a characteristic, a boron compound is sometimes added to the cathode material of the lithium primary battery. Japanese Patent Application Publication No. H11-339794 discloses a lithium primary battery using a cathode material to which boron trioxide is added. And, the following document describes the characteristics and discharge performance of lithium primary batteries whose jackets are formed of laminate film: FDK Corporation, "thin lithium primary battery", [online], [searched on Mar. 24, 2017], Internet <URL: http://www.fdk.co.jp/battery/lithium/lithium_thin.html> (hereinafter referred to as Non Patent Literature (NPL) 1).

As mentioned above, in a lithium primary battery whose active cathode material is manganese dioxide, adding boron compound to the cathode material slurry makes it possible to suppress increase of internal resistance when a nearly depleted battery is stored at elevated temperatures. But, boron compound is a substance which does not contribute to discharge, and therefore only the minimum required amount of boron compound is added. In addition, it is necessary to mix such boron compound evenly throughout the cathode material. But the boron compound serving as an additive is a powder, and therefore it is difficult to mix only a small quantity of the powder evenly throughout the cathode material slurry. Accordingly, in practice it is necessary to add a large amount of boron compound.

This disclosure aims to provide a method for preparing a cathode material for a lithium primary battery whose active cathode material is manganese dioxide, which enables a small quantity of boron compound to be distributed evenly throughout such a cathode material slurry, and which enables the lithium primary battery using such a cathode material to improve its high-temperature storage capability while nearly depleted. This disclosure also aims to provide a cathode material for a lithium primary battery prepared in such a method, and a lithium primary battery using such a cathode material.

An aspect of this disclosure is a method for preparing a cathode material for a lithium primary battery. The lithium primary battery includes manganese dioxide as an active cathode material and either lithium metal or lithium alloy as an active anode material. The method includes: a first kneading step in which a boron compound and a thickening agent are kneaded with a diluent to prepare a paste made by dissolving the boron compound in the diluent; a second kneading step in which the paste is kneaded with a conductive additive; and a third kneading step in which the paste obtained in the second kneading step is kneaded with the active cathode material and a binder to prepare the cathode material in slurry form.

It is preferable that an amount of the boron compound added in the first kneading step is such that the cathode material slurry obtained in the third kneading step contains at least 0.3 wt % and not more than 0.4 wt % of boron compound.

Within the scope of this disclosure, a cathode material prepared by the method for preparing a cathode material for a lithium primary battery is included. The cathode material includes: an electrode active material composed of manganese dioxide; a thickening agent; a conductive additive; a binder; and a boron compound. The cathode material is in slurry form, and the boron compound is dissolved.

Further, within the scope of this disclosure, included is a lithium primary battery including: an electrode assembly formed by a positive electrode and a negative electrode facing each other with a separator interposed therebetween; and a jacket in which the electrode assembly is sealed together with a non-aqueous electrolyte. The positive electrode is formed by applying onto a sheet-shaped current collector the foregoing cathode material for a lithium primary battery. The negative electrode is formed by placing on a sheet-shaped current collector either plate-shaped lithium metal or lithium alloy.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
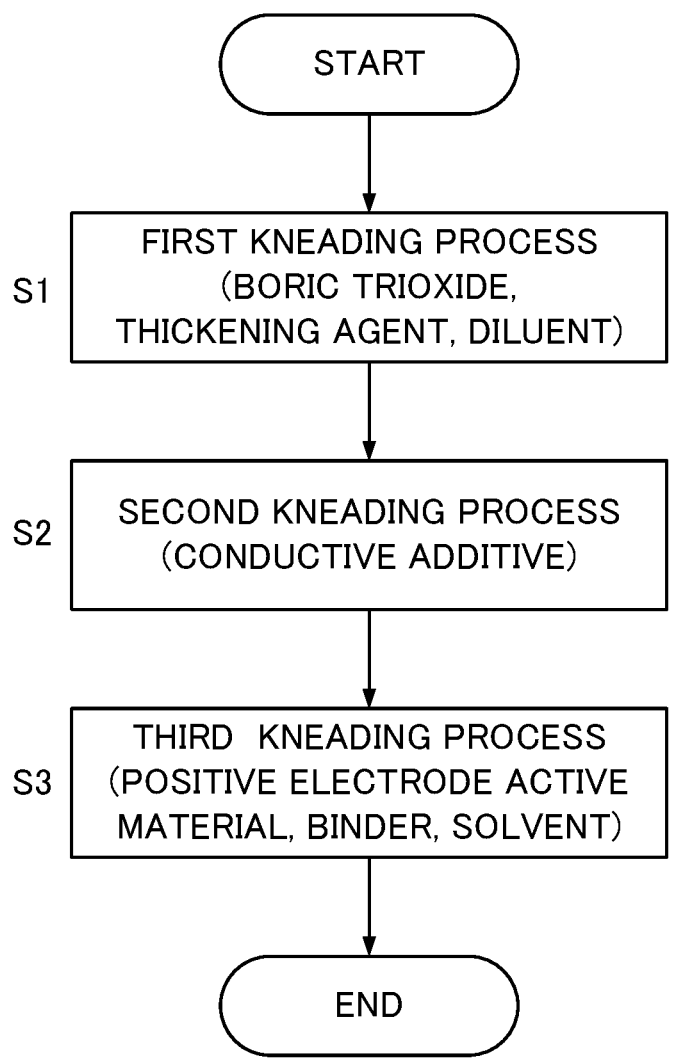
FIG. 1 is a flowchart showing a method of preparing a cathode material for a lithium primary battery.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a method for preparing a cathode material for a lithium primary battery, a cathode material for a lithium primary battery, and a lithium primary battery according to embodiments of the present disclosure are described. As used herein, the singular forms "a", "an", and "the" are intended to include the plural forms as well, unless the context clearly indicates otherwise.

The Method

A final cathode material slurry which is prepared by the method for preparing a cathode material for a lithium primary battery according to an embodiment of this disclosure is similar to the cathode material used in thin lithium battery described in NPL 1, except that a boron compound is added thereto in such a way that a small quantity of boron compound can be evenly distributed in the cathode material slurry. Thus, the cathode material slurry prepared by the method according to this embodiment contains a small quantity of boron compound evenly dissolved in the cathode material slurry, and does not contain particles of boron compound. A lithium primary battery using such a cathode material can effectively suppress increase of internal resistance even when stored at elevated temperatures while nearly depleted.

FIG. 1 shows a flowchart of the method for preparing a cathode material for a lithium primary battery according to an embodiment of this disclosure. In this embodiment, boron trioxide ($B_2O_3$) is used as a boric oxide. As shown in FIG. 1, first, boron trioxide and a thickening agent (e.g., carboxymethyl cellulose) are mixed, and the mixture is kneaded with pure water which serves as a diluent, using a planetary mixer (first kneading step: S1). Thereby, boron trioxide dissolves in the diluent to prepare paste-like, kneaded material (hereinafter also referred to as additive paste). Next, acetylene black (HS-100, Denka Company Limited) is added to the additive paste as a conductive additive, and the mixture is further kneaded (second kneading step: S2). Finally, after adding electrolytic manganese dioxide (EMD; an active cathode material), polyvinylidene difluoride (a binder) and N-Methyl-2-pyrrolidone (NMP; a solvent) thereto, the mixture is kneaded to obtain cathode material slurry (third kneading step: S3). The ratio of the active cathode material to the conductive additive to the binder is 93 wt %: 3 wt %: 4 wt %.

Thus, with the method for preparing a cathode material for a lithium primary battery according to this embodiment, not all powder materials are mixed together at once to be kneaded. Instead, boron trioxide (an additive) is dissolved in the diluent together with the thickening agent to form a paste before the paste boron trioxide is kneaded while sequentially adding other materials thereto. This process makes it possible to distribute a small quantity of powder evenly throughout the cathode material as an additive; such a distribution is difficult by other methods. Also, since the additive is evenly mixed throughout the additive paste, a minimum amount of the additive can achieve a maximum effect.

Evaluating the Characteristics

For evaluating characteristics of a cathode material prepared by the method according to this embodiment, lithium primary batteries were made as samples using a cathode material prepared by the steps shown in FIG. 1. In this evaluation, the lithium primary battery samples have a structure similar to a thin lithium battery described as "CF2722U" in the NPL 1 on Mar. 24, 2017 except for positive electrodes including a cathode material prepared by the method according to this embodiment. Four sample types with different amounts of boron trioxide in the cathode material were prepared. For each type of sample, 10 batteries were prepared.

When the additive paste was prepared, the amount of boron trioxide contained in each sample was adjusted so that the final cathode material contained boron trioxide of a certain percentage (wt %). The composition of the cathode material except for the additive paste and the electrolytes was similar to those used in the foregoing thin lithium batteries. A high-temperature storage test was carried out, in which all the samples were 88% discharged (depleted) and thereafter stored at an elevated temperature of 60° C. Then, the internal resistance of each sample was measured and correlated with length of storage in days.

The Samples

Figure 2A:
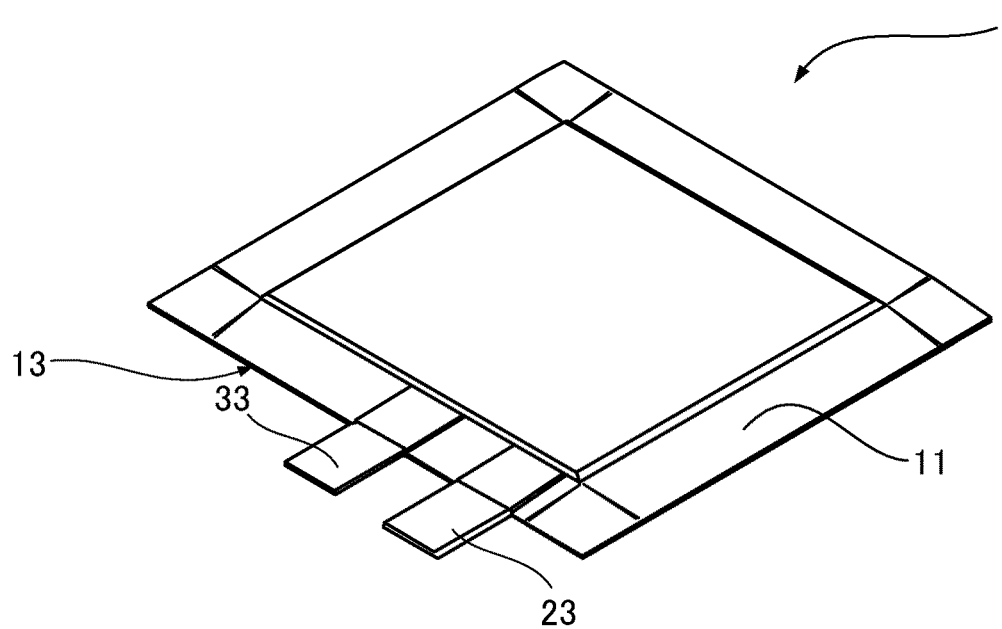
FIGS. 2A and 2B are diagrams showing the exterior and the structure, respectively, of laminated lithium primary battery samples used for evaluating the characteristics of the cathode material prepared by the method according to this disclosure.
Figure 2B:
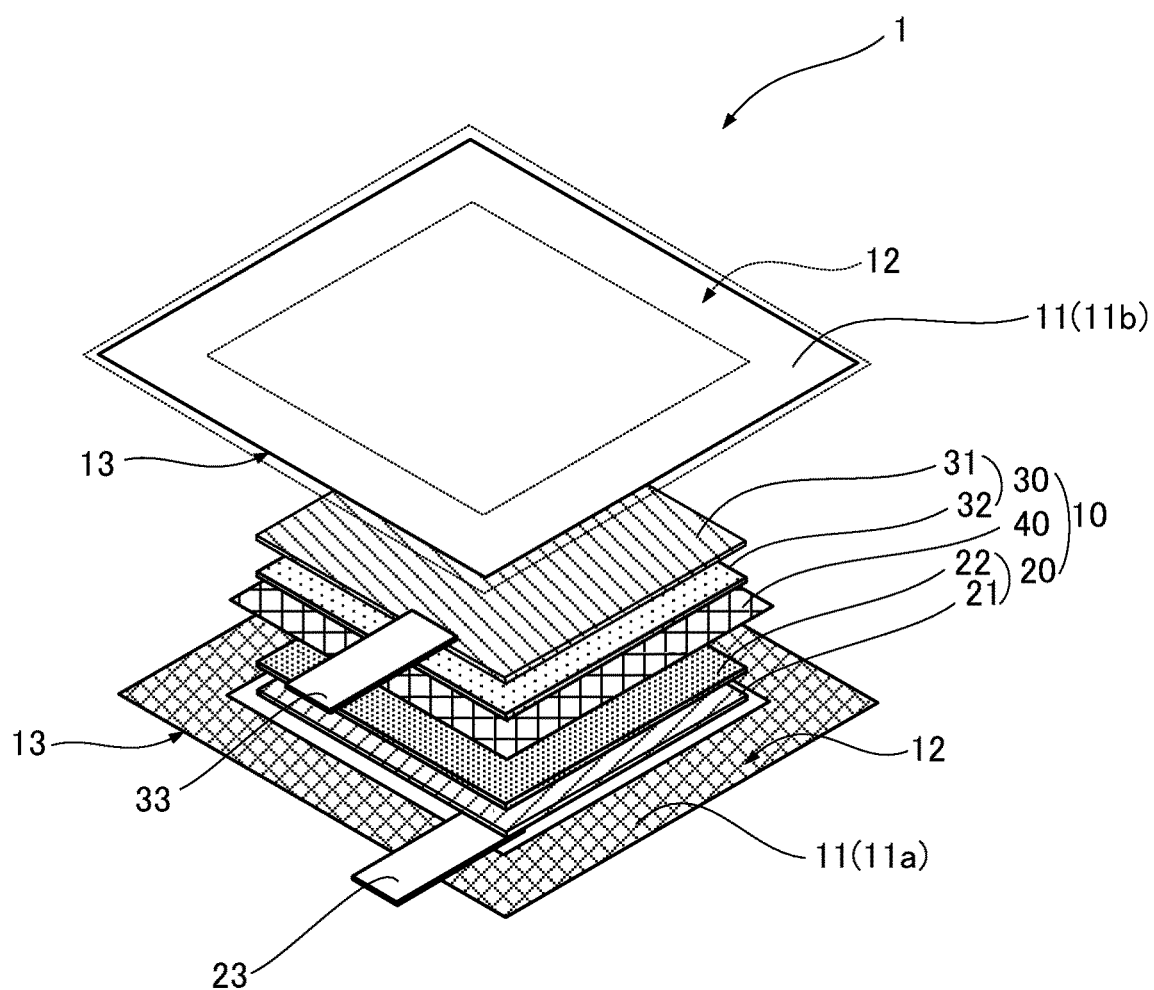

FIGS. 2A and 2B show the overall structure of the laminated lithium primary batteries (hereinafter also referred to as a lithium primary battery 1) prepared as samples. FIG. 2A is an external view of the lithium primary battery 1, and FIG. 2B is an exploded schematic perspective view of the internal structure of the lithium primary battery 1. The lithium primary battery 1 has a plate-shaped appearance, as shown in FIG. 2A. As shown in FIG. 2B, in the lithium primary battery 1, the power-generating elements are sealed in a jacket formed by shaping laminate films 11a, 11b into a flat rectangular packet. The laminated lithium primary battery 1 has a positive terminal plate 23 and a negative terminal plate 33 both extending outwards from one side 13 of the rectangular jacket 11.

The detailed structure of the lithium primary battery 1 will be described below with reference to FIG. 2B. In FIG. 2B, some parts are hatched so as to distinguish them from other parts. As shown in FIG. 2B, the jacket 11 is formed by welding together, in thermocompression bonding, the peripheral areas 12 of two sheets of rectangular aluminum laminate films 11a, 11b which are stacked (the peripheral areas 12 are indicated by hatching or a dotted line frame in FIG. 2B), and as a result the inside of the jacket is sealed.

Inside the jacket 11, an electrode assembly 10 is sealed together with an electrolyte. The electrode assembly 10 is formed by a sheet-shaped positive electrode 20 and a sheet-shaped negative electrode 30 which are laminated with a separator 40 interposed between them. The positive electrode 20 is formed by applying a cathode material slurry 22 to a main surface of a sheet-shaped cathode current collector 21 (made of metal film, etc.) and drying it. The cathode material contains manganese dioxide as an active cathode material. Thus, the cathode material 22 is prepared by the method according to the embodiment of this disclosure. To the cathode current collector 21, the positive terminal plate 23 is connected. One end of the positive terminal plate 23 is exposed outside the jacket 11, and the other end thereof is connected to a part of the cathode current collector 21 by ultrasonic welding or the like. The cathode material 22 is applied to a surface of the cathode current collector 21, which faces the separator 40.

The negative electrode 30 is formed by placing a negative electrode material 32 onto a main surface of a sheet-shaped anode collector 31 by press-bonding. The anode collector 31 is made of a metal plate, metal film or the like, and the negative electrode material 32 contains lithium as an active anode material. In similar to the cathode current collector 21, the negative terminal plate 33 is connected to the anode collector 31. One end of the negative terminal plate 33 is exposed outside the jacket 11. The cathode material 22 constituting the positive electrode 20 faces the negative electrode material 32 constituting the negative electrode 30 with the separator 40 interposed therebetween.

Test Results

Figure 3:
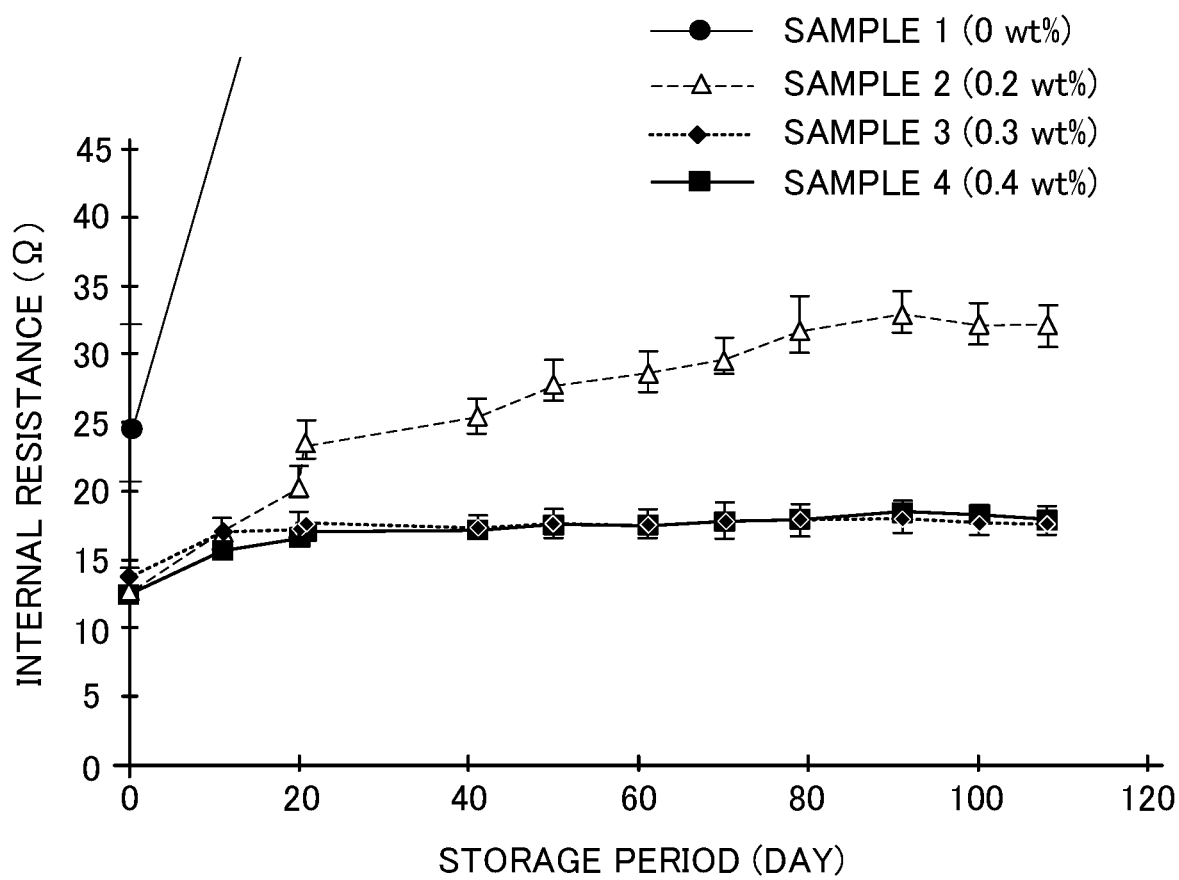
FIG. 3 is a graph showing the characteristics of the samples shown in FIGS. 2A and 2B.

FIG. 3 shows results of the high-temperature storage capability test. FIG. 3 shows relations of samples 1, 2, 3 and 4 between storage days at an elevated temperature and their internal resistances. Sample 1 did not contain boron trioxide in the cathode material 22 (boron trioxide of 0 wt %). Sample 2 contained boron trioxide of 0.2 wt % in the cathode material 22. Sample 3 contained boron trioxide of 0.3 wt % in the cathode material 22. Sample 4 contained boron trioxide of 0.4 wt % in the cathode material 22. In FIG. 3, for each type of sample, the transition of the average internal resistance of 10 batteries is indicated by a line graph. At the each data points on the line graphs, the dispersion among ten sample batteries in internal resistance is indicated by an I-shaped vertical bar.

In FIG. 3, in Sample 1, to which boron trioxide was not added (boron trioxide of 0 wt %), its internal resistance more than doubled 22 days after being stored, and therefore the test was terminated. In 22 days, the difference in internal resistance between maximum and minimum of the 10 batteries in Sample 1 was about 12Ω, and thus it has been found that there was considerable inter-individual variability.

In contrast, concerning Samples 2 to 4 in which boron trioxide was added, the results were as follows: In Sample 2, after 20 days, the increase of its internal resistance became gradual, and after about 90 days, the internal resistance remained constant. Whereas the internal resistance was approximately 14Ω at the initial stage, it remained at 30Ω or less after 100 days. The variation in internal resistance among the batteries in this sample was at most about 5Ω, and thus inter-individual variability is small compared to that of Sample 1. In Samples 3 and 4, to which respective boron trioxides of 0.3 wt % and 0.4 wt % were added, their internal resistances were 13Ω and 14Ω at the initial stage, and about 20 days after being stored, the internal resistances remained constant at about 17Ω. The variation in internal resistance was about 2Ω, and thus it has been confirmed that inter-individual variability in these samples was extremely small.

As mentioned above, concerning a lithium primary battery 1 whose cathode material 22 is prepared by the method according to this disclosure, it has been found that, even when the battery 1 has been stored at elevated temperatures while nearly depleted, increase of its internal resistance is suppressed and scatter of its characteristics is small. Also, it has been found that, if the amount of the added boron compound in the cathode material 22 is 0.3 wt %, this makes it possible to further suppress increase of the internal resistance and it improves evenness. More preferably, if the amount of added boron compound is equal to or less than 0.4 wt % (at which improvement of the characteristics was actually confirmed), this makes it possible not only to minimize the amount of added boron compound but also to achieve practical effects.

Other Embodiments

In the method for preparing a cathode material for a lithium primary battery according to the foregoing embodiment, boron trioxide is used as the boron compound that serves as an additive. However, conceivably, other boron compounds such as boric acid, lithium borate, or ammonium borate may be used. Moreover the conductive additive is not limited to acetylene black, and other carbon blacks (e.g., ketjen black), graphite, or carbon nanofiber may also be used. In any case, it is sufficient that the cathode material 22 containing boron compound as an additive is prepared by mixing and kneading the boron compound into a paste and by kneading the boron compound paste while other materials constituting the cathode material 22 are sequentially adding thereto.

The cathode material 22 prepared by the method according to an embodiment of this disclosure is applicable to various types of the lithium primary battery 1 as long as such lithium primary battery 1 includes a positive electrode 20 formed by applying a cathode material slurry 22 to a sheet-shaped cathode current collector 21. In addition, as well as laminated lithium primary batteries 1 prepared as the foregoing samples, for example, commonly known spiral-wound lithium primary batteries 1 and button (coin) lithium primary batteries 1 may also be employed.

The method for preparing a cathode material for a lithium primary battery according to this disclosure makes it possible to cause a small quantity of boron compound in the cathode material slurry 22 to be distributed evenly throughout the cathode material. The lithium primary battery 1 using such cathode material 22 can effectively suppress increase of internal resistance even when stored at elevated temperatures while nearly depleted.

What is claimed is:
1. A method for preparing cathode material for a lithium primary battery,
the lithium primary battery including an active cathode material and an active anode material,
the active cathode material being manganese dioxide, the active anode material being either one of lithium metal and lithium alloy, the method comprising:

a first kneading step, in which boron trioxide ($B_2O_3$) and a thickening agent are kneaded with a diluent to prepare a paste made by dissolving the boron trioxide ($B_2O_3$) in the diluent;

a second kneading step, in which the paste obtained in the first kneading step is further kneaded with carbon black; and a third kneading step, in which the paste obtained in the second kneading step is further kneaded with the active cathode material and a binder to prepare the cathode material in slurry form, wherein the cathode material obtained in the third kneading step contains at least 0.3 wt % and not more than 0.4 wt % of the boron trioxide ($B_2O_3$).

* * * * *